(12) United States Patent
Patel et al.

(10) Patent No.: US 9,239,801 B2
(45) Date of Patent: Jan. 19, 2016

(54) SYSTEMS AND METHODS FOR PREVENTING UNAUTHORIZED STACK PIVOTING

(71) Applicant: Intel Corporation, Santa Clara, CA (US)

(72) Inventors: Baiju V. Patel, Portland, OR (US); Xiaoning Li, Hillsboro, OR (US); H P. Anvin, San Jose, CA (US); Asit K. Mallick, Saratoga, CA (US); Gilbert Neiger, Hillsboro, OR (US); James B. Crossland, Banks, OR (US); Toby Opferman, Hillsboro, OR (US); Atul A. Khare, Portland, OR (US); Jason W. Brandt, Austin, TX (US); James S. Coke, Shingle Springs, CA (US); Brian L. Vajda, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 13/910,333

(22) Filed: Jun. 5, 2013

(65) Prior Publication Data

US 2014/0365742 A1    Dec. 11, 2014

(51) Int. Cl.
G06F 12/14    (2006.01)
G06F 9/30    (2006.01)
G06F 9/45    (2006.01)

(52) U.S. Cl.
CPC .............. *G06F 12/145* (2013.01); *G06F 8/434* (2013.01); *G06F 9/30105* (2013.01); *G06F 9/30134* (2013.01)

(58) Field of Classification Search
CPC ... G06F 12/145; G06F 8/434; G06F 9/30105; G06F 9/30134
See application file for complete search history.

(56) References Cited

U.S. PATENT DOCUMENTS

| 4,969,091 | A | * | 11/1990 | Muller | ................ 712/228 |
| 5,003,466 | A | * | 3/1991 | Schan et al. | ............. 714/41 |
| 5,109,329 | A | * | 4/1992 | Strelioff | ............. 710/261 |
| 5,469,566 | A | * | 11/1995 | Hohenstein et al. | ....... 714/6.1 |
| 5,872,987 | A | * | 2/1999 | Wade et al. | ............. 712/3 |
| 5,953,741 | A | * | 9/1999 | Evoy et al. | ............. 711/132 |
| 7,716,495 | B2 | | 5/2010 | Shupak et al. | |
| 8,176,567 | B2 | | 5/2012 | Kirschner et al. | |
| 8,209,757 | B1 | | 6/2012 | Kennedy et al. | |
| 2004/0168078 | A1 | | 8/2004 | Brodley et al. | |
| 2007/0150879 | A1 | * | 6/2007 | Rangarajan et al. | ....... 717/154 |

FOREIGN PATENT DOCUMENTS

EP    0760975 B1    7/2004

OTHER PUBLICATIONS

International Search Report and Written Opinion received for PCT Patent Application No. PCT/US2014/040209, mailed on Sep. 23, 2014, 10 Pages.

* cited by examiner

*Primary Examiner* — Hiep Nguyen
(74) *Attorney, Agent, or Firm* — Lowenstein Sandler LLP

(57) ABSTRACT

An example processing system may comprise: a lower stack bound register configured to store a first memory address, the first memory address identifying a lower bound of a memory addressable via a stack segment; an upper stack bound register configured to store a second memory address, the second memory address identifying an upper bound of the memory addressable via the stack segment; and a stack bounds checking logic configured to detect unauthorized stack pivoting, by comparing a memory address being accessed via the stack segment with at least one of the first memory address and the second memory address.

19 Claims, 9 Drawing Sheets

```
IF (64-bit mode) THEN
IF (mem_ss <= STKLBU64) OR (mem_ss >= STKUBU64) THEN
    { STKSTATUS := linear(mem_ss);
      #SS(0)}
ELSE IF (32-bit mode) THEN
IF (mem_ss <= STKLBU32) OR (mem_ss >= STKUBU32) THEN
    {STKSTATUS := linear(mem_ss);
      #SS(0)}
```

FIG. 8a

```
IF (Supervisor mode) THEN
IF (mem_ss <= STKLBS) OR (mem_ss >= STKUBUS) THEN
    { STKSTATUS := linear(mem_ss);
      #SS(0)}
```

FIG. 8b

SYSTEMS AND METHODS FOR PREVENTING UNAUTHORIZED STACK PIVOTING

TECHNICAL FIELD

The present disclosure is generally related to computer systems, and is specifically related to systems and methods for preventing unauthorized stack pivoting.

BACKGROUND

Stack pivoting is often exploited in return-oriented programming (ROP) attacks. ROP is a method of hijacking the execution flow of the current process by exploiting return instruction which, in many processor architectures, retrieves from the top of the stack the address of the next executable instruction within the calling routine. Thus, by modifying the return address on the stack, an attacker can divert the execution flow of the current process to an arbitrary memory location.

Having hijacked the execution flow, the attacker can, for example, initialize the arguments and perform a library function call. This technique is known as "return-into-library." In another example, the attacker can locate within the code segment several instruction sequences to be executed. This approach is known as "borrowed code chunks technique."

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 8a-8b schematically illustrate the conditions to be evaluated by the stack bounds checking logic, in accordance with one or more aspects of the present disclosure.

DETAILED DESCRIPTION

Figure 1:
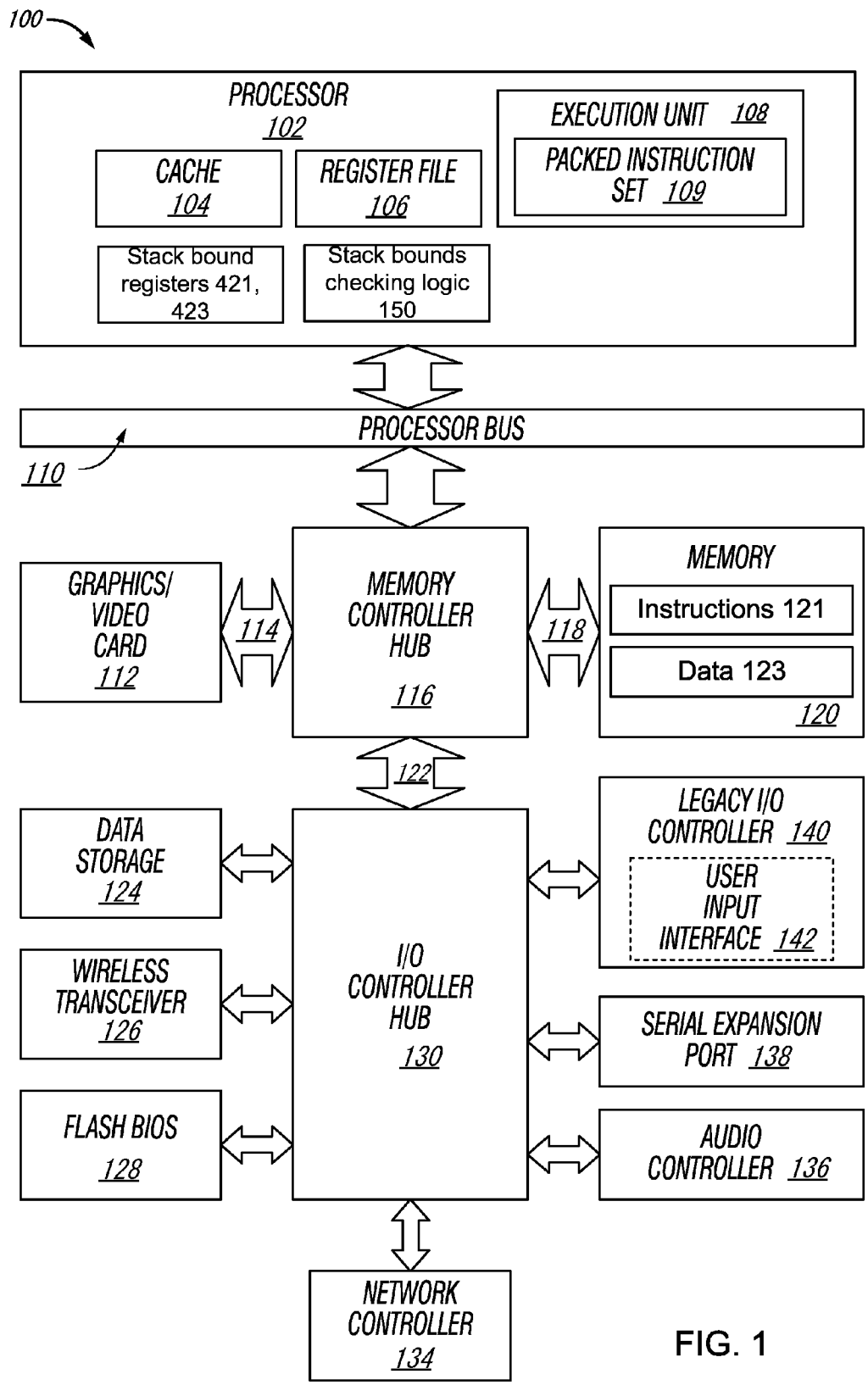
FIG. 1 depicts a high-level component diagram of an example computer system, in accordance with one or more aspects of the present disclosure.

Described herein are computer systems and related methods for detecting unauthorized stack pivoting. Unauthorized stack modification, or pivoting, may be used by a potential attacker in attempting a return-oriented programming (ROP) attack. The latter may involve unauthorized modification of a procedure return address stored on the stack in order to divert the execution flow of the current process to an arbitrary memory location. A variety of methods can be exploited by the attacker for unauthorized stack modification. For example, the buffer overflow method involves supplying more input data than the routine is expecting to receive, under the assumption that the input buffer is located on the stack.

To prevent unauthorized stack modification, a pair of stack bound registers may be provided within a processor for storing stack bounds. "Stack bounds" herein shall refer to predefined memory addresses in the stack segment representing the lower and upper limits of the permissible range of memory addressable via the stack segment.

The processor may implement stack bounds checking logic by comparing a memory address being accessed via a stack segment with the values stored in the stack bound registers. Should the memory address be outside of the permissible range established by the values of the stack bound registers, the processor may store in a stack status register the address being accessed via the stack segment and generate a stack fault exception.

In certain implementations, the processor may have distinct stack bound registers for each of the 32-bit user mode, 64-bit user mode, and the supervisor mode. The values of the stack bound registers may be context switchable using processor state save/restore commands (e.g., XSAVE/XRSTOR).

Various aspects of the above referenced methods and systems are described in details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments are described with reference to a processor, other embodiments are applicable to other types of integrated circuits and logic devices. Similar techniques and teachings of embodiments described herein can be applied to other types of circuits or semiconductor devices that can benefit from higher pipeline throughput and improved performance. The teachings of embodiments described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments described herein rather than to provide an exhaustive list of all possible implementations of embodiments described herein.

Although the below examples describe instruction handling and distribution in the context of execution units and logic circuits, other embodiments of the systems and methods described herein can be accomplished by way of a data or instructions stored on a machine-readable, tangible medium, which when performed by a machine cause the machine to perform functions consistent with at least one embodiment described herein. In one embodiment, functions associated with embodiments described herein are embodied in machine-executable instructions. The instructions can be used to cause a general-purpose or special-purpose processor that is programmed with the instructions to perform the methods described herein. Embodiments described herein may be provided as a computer program product or software which may include a machine or computer-readable medium having stored thereon instructions which may be used to program a computer (or other electronic devices) to perform one or more operations according to embodiments described herein. Alternatively, operations of embodiments described herein might be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processor cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

FIG. 1 depicts a high-level component diagram of one example of a computer system in accordance with one or more aspects of the present disclosure. A computer system 100 may include a processor 102 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

Embodiments are not limited to computer systems. Alternative embodiments of the systems and methods described herein can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits.

In certain implementations, the processor 102 may further include a lower stack bound register 421, an upper stack bound register 423, and a stack bounds checking logic 150. In one illustrative example, the processor 102 may include a pair of stack bound registers for each of two or more modes of operation, e.g., the 32-bit user mode, the 64-bit user mode, and the supervisor mode. The functioning of the stack bounds checking logic is described in details herein below.

System 100 includes a memory 120. Memory 120 includes a dynamic random access memory (DRAM) device, a static random access memory (SRAM) device, flash memory device, or other memory device. Memory 120 stores instructions 121 and/or data 123 represented by data signals that are to be executed by the processor 102. In certain implementations, instructions 121 may include instructions employing the stack bounds checking logic 150 for detecting an attempted stack bounds violation, as described in more details herein below.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
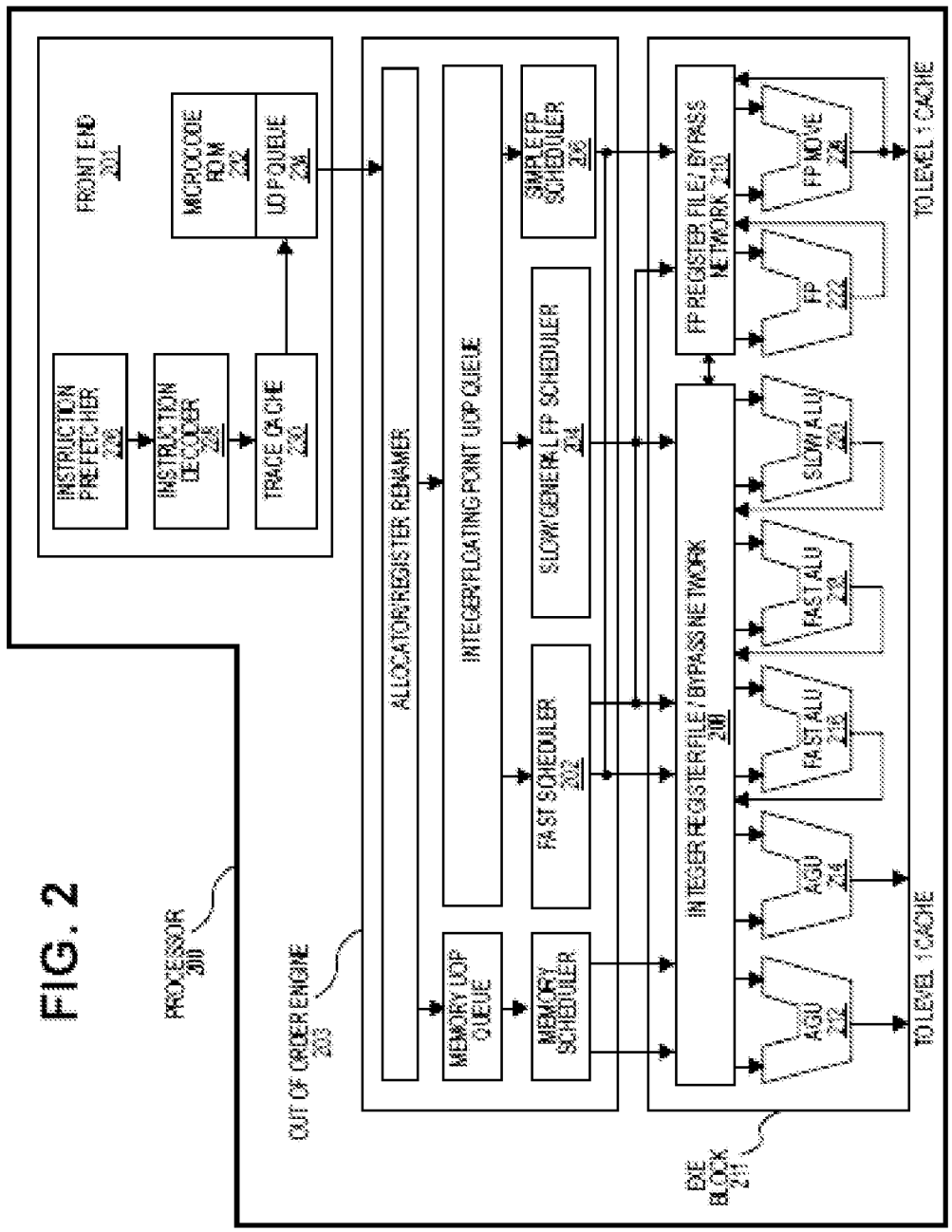
FIG. 2 depicts a block diagram of a processor, in accordance with one or more aspects of the present disclosure.

FIG. 2 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the microcode ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
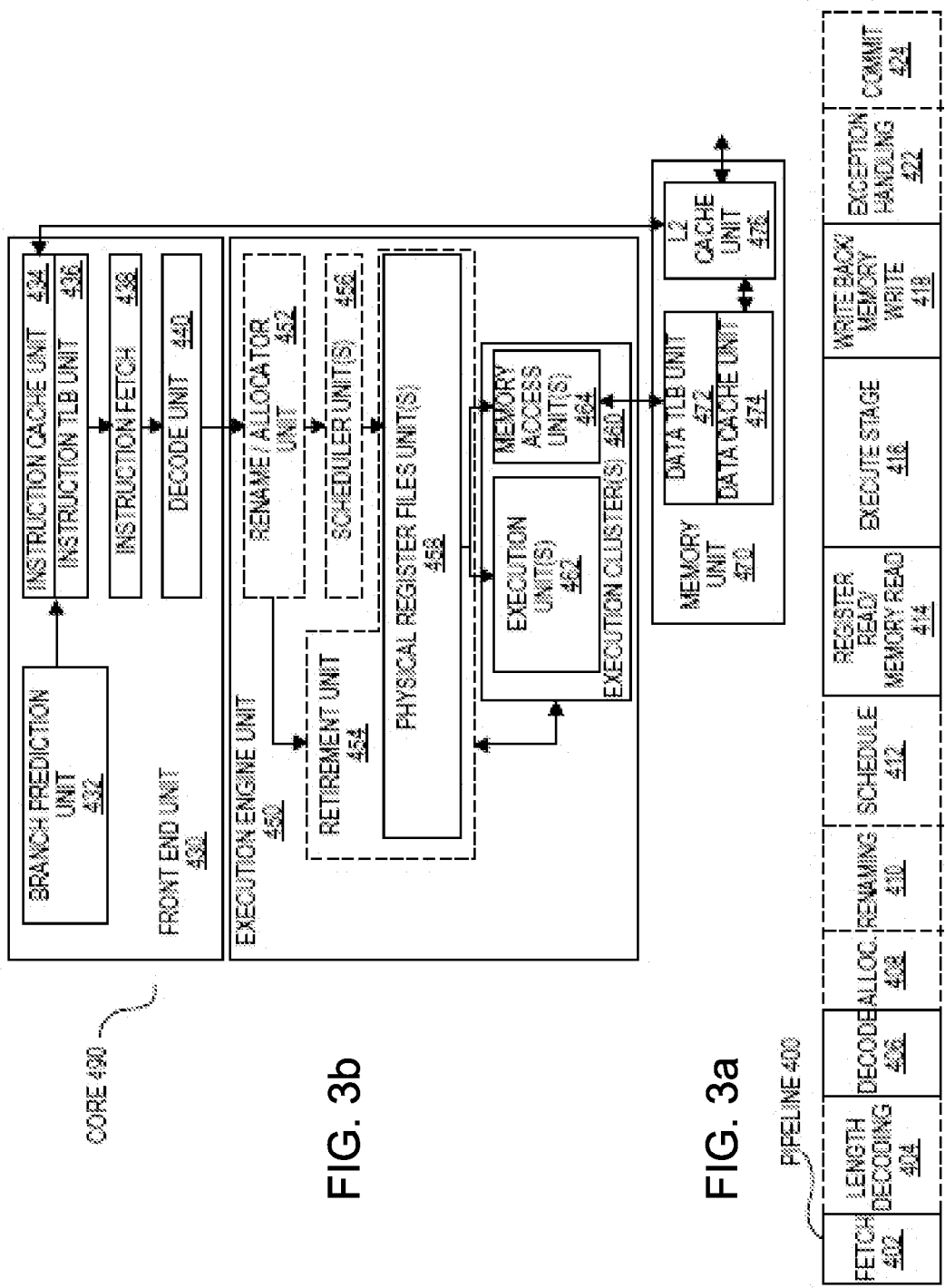
FIGS. 3a-3b schematically illustrates elements of a processor micro-architecture, in accordance with one or more aspects of the present disclosure.

FIGS. 3a-3b schematically illustrates elements of a processor micro-architecture, in accordance with one or more aspects of the present disclosure. In FIG. 3a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 3b, arrows denote a coupling between two or more units and the direction of the arrow indicates a direction of data flow between those units. FIG. 3b shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
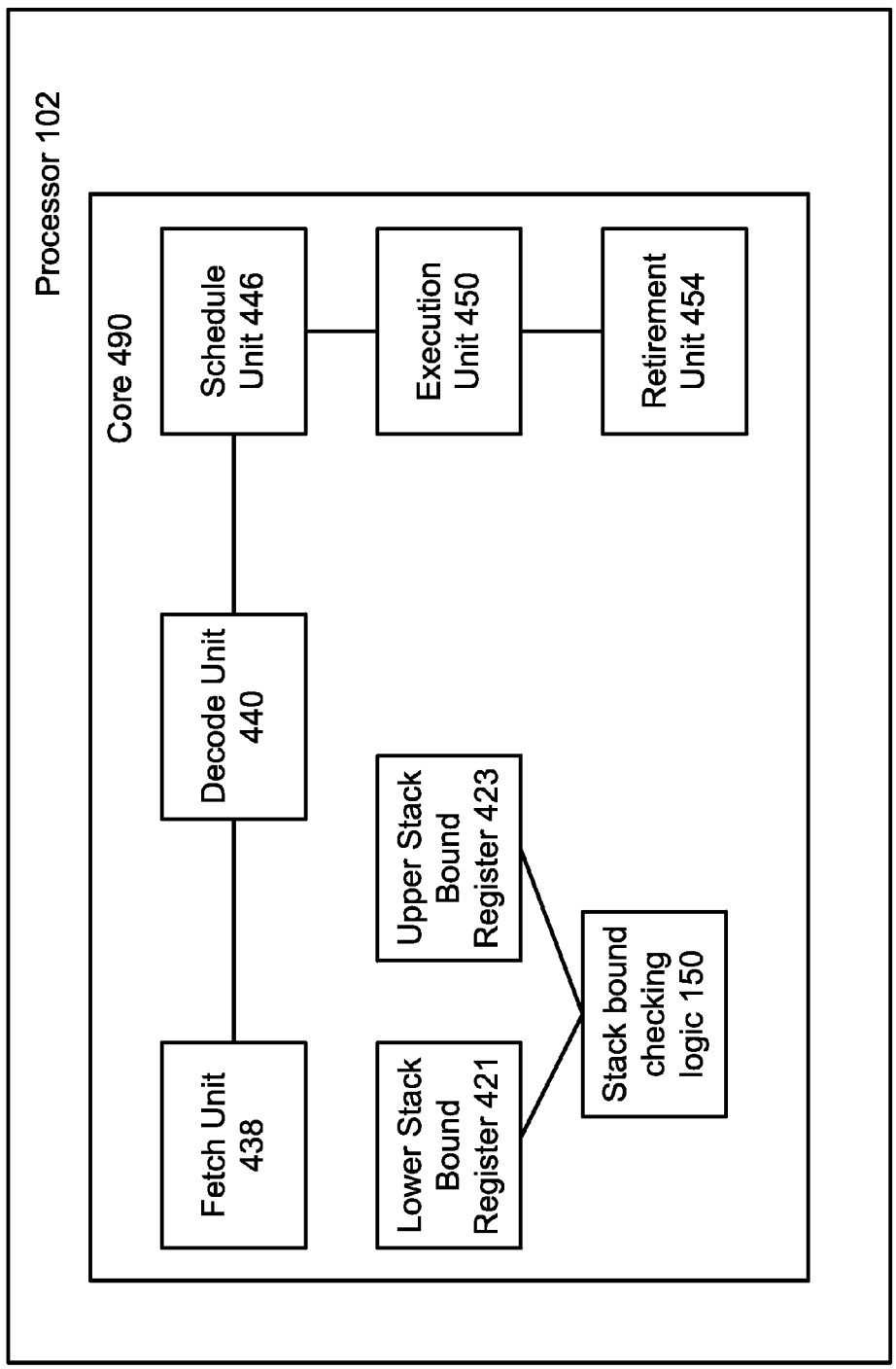
FIG. 4 schematically illustrates several aspects an example processor and other components of the example computer system 100 of FIG. 1, in accordance with one or more aspects of the present disclosure.

FIG. 4 illustrates a block diagram of an example processor 102 of the computer system 100, in accordance with one or more aspects of the present disclosure. Referring to FIG. 4, the processor core 490 may include a fetch unit 202 to fetch instructions for execution by the core 490. The instructions may be fetched from one or more storage devices, such as the memory 115. The processor core 490 may further include a decode unit 440 to decode a fetched instruction into a one or more micro-operations (µops). The processor core 490 may further include a schedule unit 446 to store a decoded instruction received from the decode unit 440 until the instruction is ready to be issued, e.g., until the operand values for the decoded instruction become available. The schedule unit 446 may schedule and/or issue decoded instructions to an execution unit 450.

The execution unit 450 may include one or more arithmetic and logic units (ALUs), one or more integer execution units, one or more floating-point execution unit, and/or other execution units. In certain implementations, the execution unit 450 may execute instructions out-of-order (OOO). The processor core 490 may further include a retirement unit 454 to retire executed instructions after they are committed.

In certain implementations, the processor 102 may further include a lower stack bound register 421, an upper stack bound register 423, and a stack bounds checking logic 150. In one illustrative example, the processor 102 may include a pair of stack bound registers for each mode of operation, e.g., the 32-bit user mode, the 64-bit user mode, and the supervisor mode. The functioning of the stack bounds checking logic is described in details herein below. Even though in FIG. 4 the logic 150 is shown to be inside a core 490, the logic 150 may be provided elsewhere in the computer system 100. Furthermore, the logic 150 and/or some of its components may be shared among a plurality of processor cores.

In certain implementations, the processor 102 may implement memory segmentation and/or memory paging. Segmentation may provide a mechanism for isolating individual code, data, and stack modules so that multiple tasks can run on the same processor without interfering with one another. Paging may provide a mechanism for implementing a demand-paged, virtual-memory system where sections of a task's execution environment are mapped into physical memory as needed. Paging can also be used to provide isolation between multiple tasks.

Figure 5:
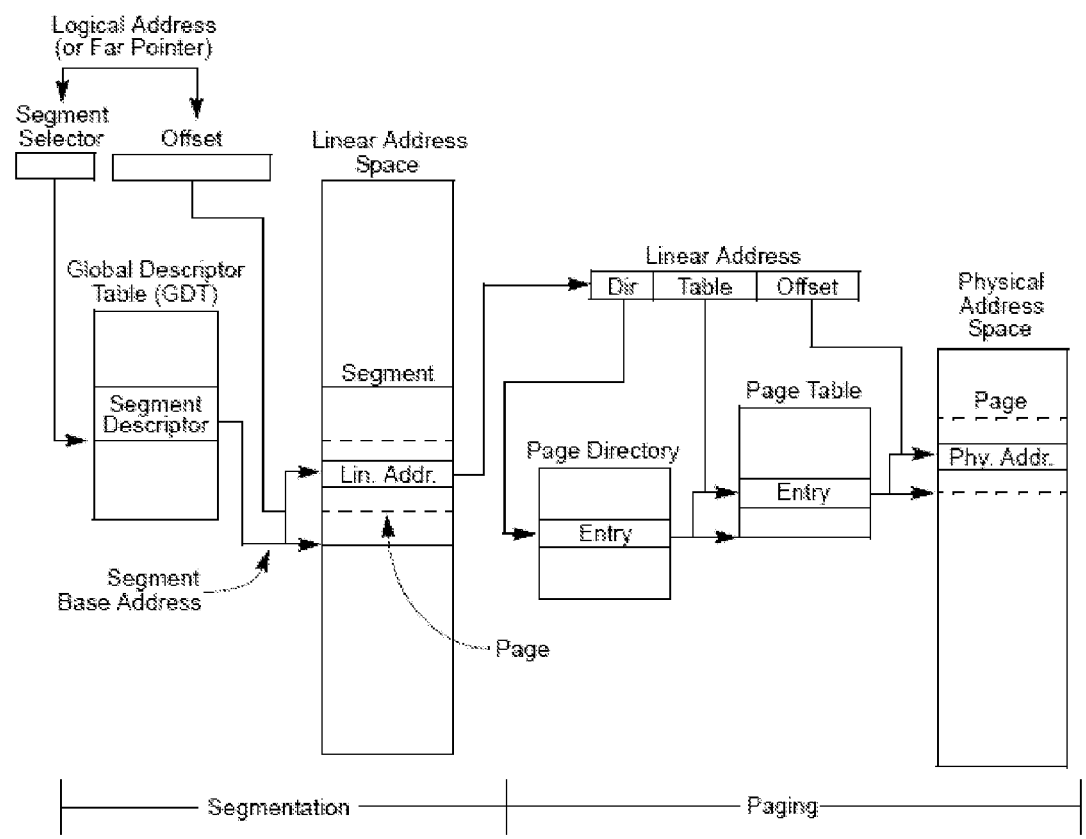
FIG. 5 schematically illustrates the memory segmentation mechanism employed by the processor 102 of the example computer system 100 of FIG. 1, in accordance with one or more aspects of the present disclosure.

As schematically illustrated by FIG. 5, the segmentation mechanism may be employed for dividing the memory addressable by the processor 102 (also referred to as the linear address space) into smaller protected address spaces called segments. The segments can be employed to hold the code, data, and stack for a task and/or to hold system data structures (such as a task state segment (TSS) or a local descriptor table (LDT)). If multiple tasks are simultaneously being executed, each task can be assigned its own set of segments. The processor 102 can enforce the boundaries between these segments and insure that one task does not interfere with the execution of another task by writing into the other task's segments.

All the memory segments may be contained in the processor's linear address space. To locate a byte in a particular segment, a logical address (also referred to as a far pointer) may be provided. A logical address may include a segment selector and an offset. The segment selector is a unique identifier of a data structure called segment descriptor residing in a descriptor table (such as the global descriptor table (GDT)). Each segment may have a segment descriptor associated with it, which specifies the size of the segment, the access rights and the privilege level for the segment, the segment type, and the location of the first byte of the segment in the linear address space (also referred to as the base address of the segment). The offset part of the logical address may be added to the base address for the segment to locate a byte within the segment. The base address plus the offset may thus form a linear address in the processor's linear address space.

Since a multitasking operating system may define a linear address space much larger than it is economically feasible to contain all at once in physical memory, some method of "virtualizing" the linear address space is needed. This virtualization of the linear address space may be handled through the processor's paging mechanism. Paging supports a virtual memory environment where a large linear address space is simulated with a smaller amount of random access memory (RAM) and some disk storage. Each segment may be divided into pages of a defined size (e.g., 4 KB) which may be stored either in RAM or on the disk. The operating system may maintain a page directory and a set of page tables to keep track of the pages. When a task attempts to access an address location in the linear address space, the processor uses the page directory and page tables to translate the linear address into a physical address and then performs the requested operation (read or write) on the memory location. If the page being accessed is not currently in physical memory, the processor interrupts execution of the program (by generating a page-fault exception). The operating system may then read the page from the disk and continue executing the task. If paging is not used, the linear address space of the processor is mapped directly into the physical address space of processor. The physical address space is defined as the range of addresses that the processor can generate on its address bus.

The processor 102 may employ several segment registers to support the segmentation mechanism. In certain implementations, the processor 102 may support typing of segments, in order to restrict the memory access operations that may be performed on a particular type of segment. Segment typing may be supported by associating memory types with segment registers. In one example, the processor 102 may include at least one code segment register (which may also be referred to as CS), two or more data segment registers (which may also be referred to as DS, ES, FS, and GS), and at least one stack segment register (which may also be referred to as SS).

In certain implementations, the processor 102 may operate in the 32-bit user mode, 64-bit user mode, or the supervisor mode. In 32-bit user mode, the processor 102 may support memory segmentation and optional paging. In 64-bit user mode, segmentation may be disabled to create a flat 64-bit linear-address space. The processor may treat the segment base of segment registers, including CS, DS, ES, and SS as zero, creating a linear address that is equal to the effective address.

Figure 6:
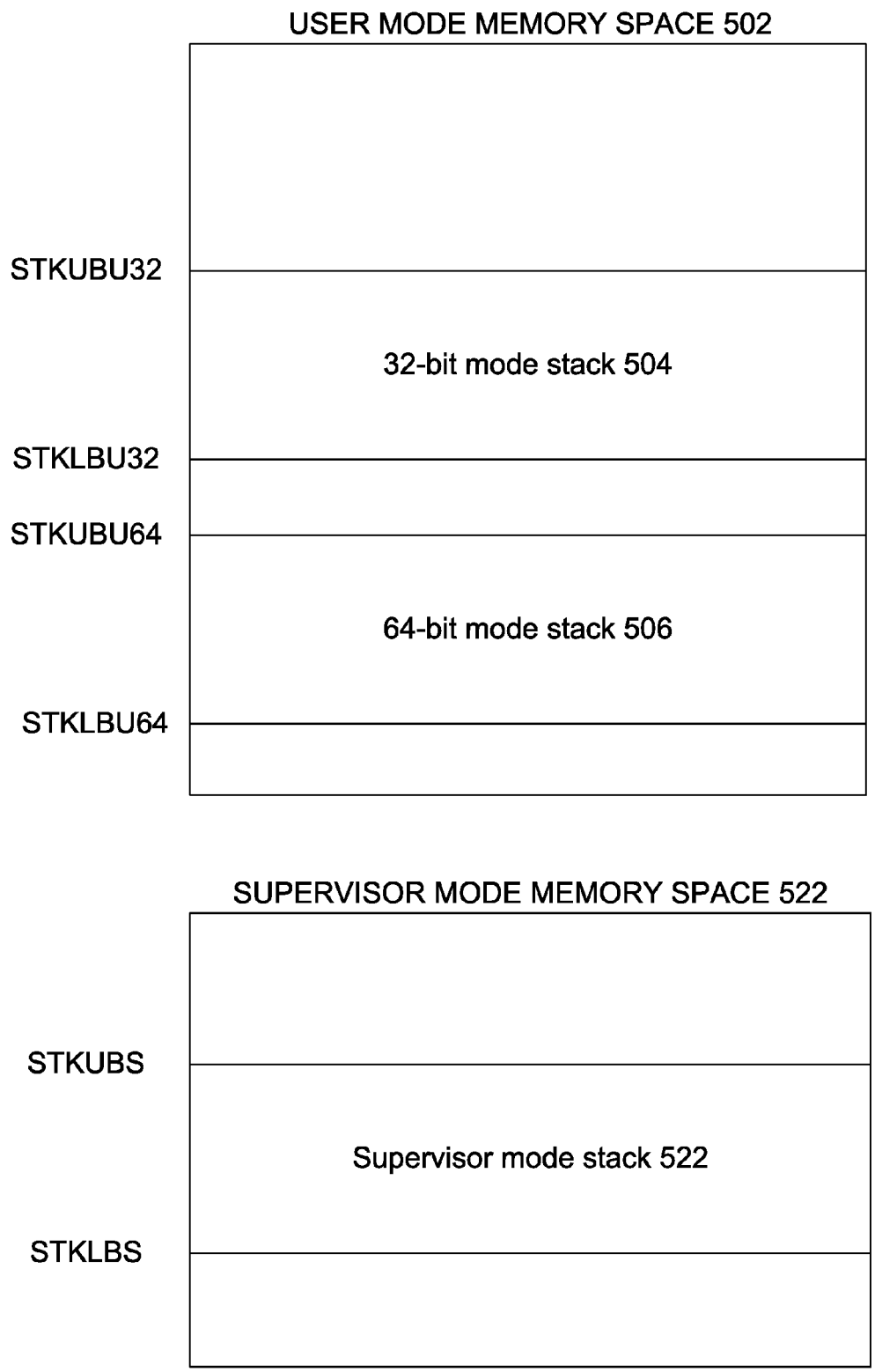
FIG. 6 schematically illustrates privilege levels of the processor's memory protection mechanism, in accordance with one or more aspects of the present disclosure.

In a further aspect, the processor's memory protection mechanism may recognize several privilege levels. The supervisor mode may be distinguished from the 32-bit user mode or the 64-bit user mode by the value of current privilege level (CPL). In one example, schematically illustrated by FIG. 6, the privilege levels, also referred to as protection rings, may be numbered from 0 to 3, and the greater numbers may mean lesser privileges. Protection ring 0 may be reserved for segments containing the most privileged code, data, and stacks, such as those of a kernel of an operating system. Outer protection rings may be used for application programs. In certain implementations, operating systems may use a subset of the plurality of the protection rings, e.g., ring 0 for the operating system kernel, and ring 3 for applications.

The processor may use privilege levels to prevent a process operating at a lesser privilege level from accessing a segment with a greater privilege. The current privilege level (CPL) is the privilege level of the currently executing process. The CPL may be stored in bits 0 and 1 of the CS and SS segment registers. The CPL may be equal to the privilege level of the code segment from which instructions are being fetched. The processor may change CPL when the program control is transferred to a code segment with a different privilege level. The processor may perform privilege level check by comparing the CPL with the privilege level of a segment or a call gate being accessed (descriptor privilege level, DPL) and/or the requested privilege level (RPL) assigned to a segment selector being accessed. When a processor detects a privilege level violation, it may generate a general protection exception.

In certain implementations, the processor 102 may operate in the supervisor mode or user mode. CPL values of 0, 1, or 2 may correspond to the supervisor mode; CPL value of 3 may correspond to the user mode. The current mode of operation may define whether the processor may execute certain instructions and/or access certain memory pages.

As noted herein above, the processor 102 may prevent unauthorized stack pivoting by employing a pair of stack bound registers, including a lower stack bound register and an upper stack bound register. In one illustrative example, the processor 102 may have a dedicated pair of stack bound registers for each of the 32-bit user mode, 64-bit user mode, and the supervisor mode of operation.

Figure 7:
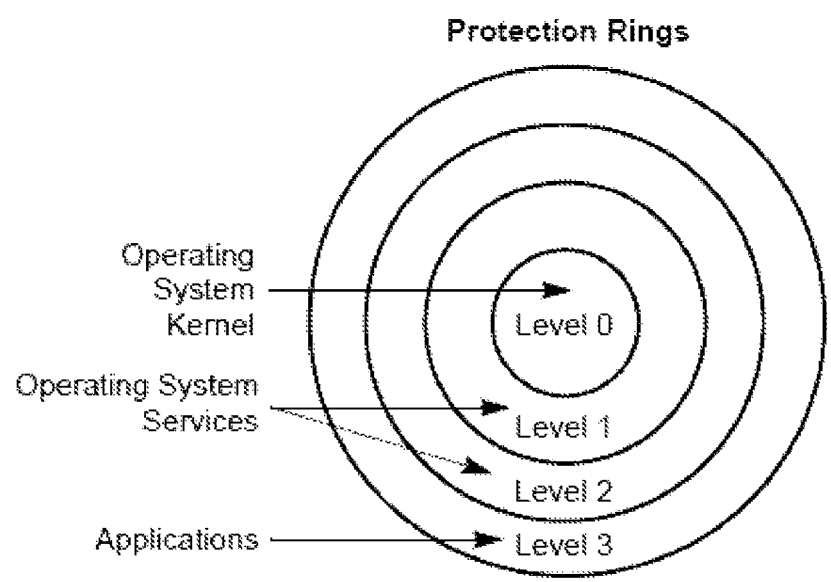
FIG. 7 schematically illustrates a layout of memory accessible by the stack segment of the computer system 100 of FIG. 1, in accordance with one or more aspects of the present disclosure.

In certain implementations, the processor 102 may implement stack bounds checking logic to compare a memory address being accessed via a stack segment with the values stored in the stack bound registers. FIG. 7 schematically illustrates a layout of memory accessible by the stack segment of the computer system 100. The user mode addressable memory space 502 may include a first address range 504 reserved for the 32-bit user mode stack and a second address range 506 reserved for the 64-bit user mode stack. The supervisor mode addressable memory space 520 may include an address range 522 reserved for the stack.

The lower stack bound register and the upper stack bound register may be employed to store the address range of the memory addressable using a stack segment. As schematically illustrated by FIG. 7, STKLBS and STKUBS registers may be employed to store lower and upper stack bounds in the supervisor mode, STKLBU32 and STKUBU32 registers may be employed to store lower and upper stack bounds in the 32-bit user mode, and STKLBU64 and STKUBU64 registers may be employed to store lower and upper stack bounds in the 64-bit user mode.

The stack bounds checking logic 150 may ascertain whether the effective address of an attempted memory access operation which uses a stack segment falls within the permissible range specified by the pair of stack bound registers corresponding to the current mode of operation. Should the effective address be outside of the permissible range established by the values of the stack bound registers, the processor may generate a stack fault exception. The address being accessed via the stack segment may be stored by the processor in the stack status register prior to generating the exception, for use by the exception handling logic.

In one illustrative example, the stack bounds checking logic may employ the segment-limit adders to compare the memory address being accessed to the lower and upper bound values. Alternatively, the stack bounds checking logic may employ dedicated adders to compare the memory address being accessed to the lower and upper bound values.

Responsive to detecting a memory access using the stack segment, the stack bounds checking logic may ascertain whether the effective address of an attempted memory access operation which uses a stack segment falls within the permissible range specified by the pair of the stack bound registers for the current mode of operation, by evaluating the conditions represented in FIGS. 8a (user mode of operation) and 8b (supervisor mode of operation).

The stack bounds checking logic may ascertain whether the memory address being accessed (labeled mem_ss in FIGS. 8a-8b) is less than or equal to the value stored in the upper bound register for the current mode of operation, and more than or equal to the value stored in the lower bound register for the current mode of operation. If the condition is not met, the processor may store in a stack status register the address being accessed via the stack segment and generate a stack fault exception.

In a further aspect, the processor 102 may comprise two or more registers which may be used for addressing the stack segment, e.g., a base pointer (BP) register and a stack segment (SS) register. The processor 102 may be configured to enable or disable the stack bounds checking logic depending upon which register is employed to address the memory being accessed. In one illustrative example, the processor 102 may enable the stack bounds checking logic if the memory address being accessed is stored using the SP register and disable the stack bounds checking logic if the memory address being accessed is stored using the BP register.

In a further aspect, the values of the stack bound registers may be context switchable using processor state save/restore commands (e.g., XSAVE/XRSTOR). A processor state save command (e.g., XSAVE) may cause saving the full or partial state of the processor to a memory location specified by an operand. A processor state restore command (e.g., XRSTOR) may cause loading the full or partial state of the processor from a memory location specified by an operand. The subset of processor state components to be stored/loaded may be specified by an implicit mask operand (e.g., via the EDX: EAX register pair). In one illustrative example, the processor may be configured to only allow modifying the values of the stack bound registers in the supervisor mode.

In certain implementations, when executing XRSTOR command, the processor may ascertain whether a previously stored integrity check value is equal to a pre-defined hash of the stack bounds and a pre-defined key value:

STK_ICV_S=HASH(STKLBx,STKUBx,
 STK_x_KEY)

where STK_ICV_S is the integrity check value,
HASH is a pre-defined hash-function,
STKLBx and STKUBx are, respectively, stack lower and upper bounds for the current mode of operation, and
STK_x_KEY is the key value for the current mode of operation.

Should the integrity check value be equal to the hash of the stack bound values and the key value, the processor may proceed with restoring the stack bound values from the memory; otherwise, the processor may assign pre-defined bound values to the respective stack bound registers. The initial values of the integrity check value, the key value, and the stack bound values may be set by the operating system, e.g., at the time of creating a thread or process.

In a further aspect, the processor 102 may further implement a pair of instructions to enable/disable stack bounds checking logic, and a status bit indicating whether the stack bounds checking logic is enabled or disabled. Responsive to receiving a stack check enable instruction (STKENB), the processor 102 may set the STKENABLE bit and enable detecting attempted unauthorized stack pivoting by the stack bounds checking logic. Responsive to receiving a stack check disable instruction, the processor 102 may clear the STKENABLE bit and disable detecting stack bounds violation by the stack bounds checking logic.

In certain implementations, the operating system running on the computer system 100 may enable the stack checking logic by issuing the stack check enable instruction. The operating system may further set the values of the stack bound registers for each running process and/or thread. The values of the stack bound registers may be a part of a thread/process context record, and thus a context switching using XSAVE/XRSTOR instructions may involve saving/restoring the stack bound values along with the stack pointer value.

Figure 9:
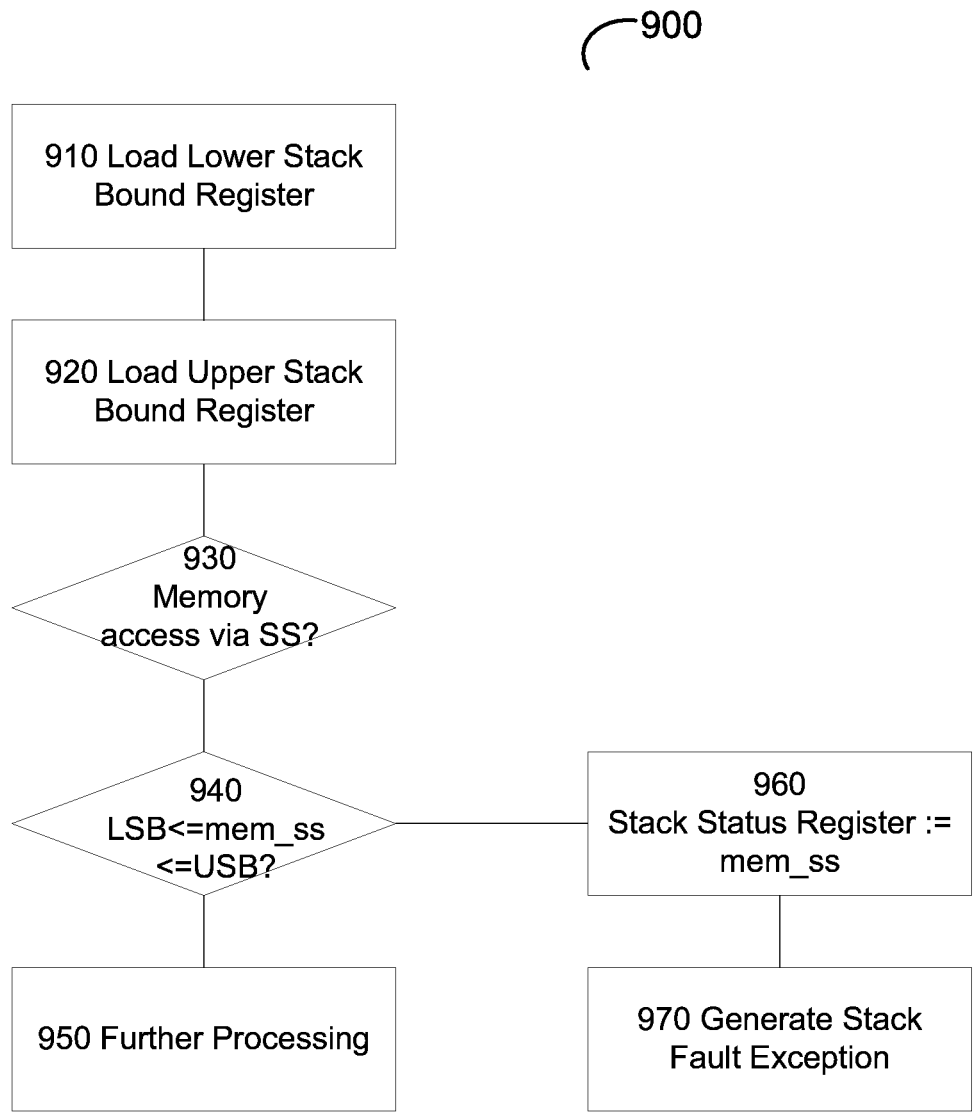
FIG. 9 depicts a flow diagram of an example method for detecting unauthorized stack pivoting, in accordance with one or more aspects of the present disclosure.

FIG. 9 depicts a flow diagram of an example method for detecting unauthorized stack pivoting, in accordance with one or more aspects of the present disclosure. The method 900 may be performed by a computer system that may comprise hardware (e.g., circuitry, dedicated logic, and/or programmable logic), software (e.g., instructions executable on a computer system to perform hardware simulation), or a combination thereof. The method 900 and/or each of its functions, routines, subroutines, or operations may be performed by one or more physical processors of the computer system executing the method. Two or more functions, routines, subroutines, or operations of method 900 may be performed in parallel or in an order which may differ from the order described above. In one example, as illustrated by FIG. 9, the method 900 may be performed by the computer system 100 of FIG. 1.

Referring to FIG. 9, at block 910, the processor of the computer system 100 may store, in the lower stack bound register, a memory address identifying the lower bound of the memory addressable via the stack segment.

At block 920, the processor may store, in the upper stack bound register, a memory address identifying the upper bound of the memory addressable via the stack segment. As noted herein above, in certain implementations the processor may have a dedicated pair of stack bound registers, including a lower stack bound register and an upper stack bound register, for each of the 32-bit user mode, 64-bit user mode, and the supervisor mode.

Responsive to detecting, at block 930, a memory access via the stack segment, the processor may, at block 940, ascertain whether the memory address being accessed is within the range specified by the stack bound registers, by evaluating the conditions represented in FIGS. 8a (for the user mode of operation) and 8b (for the supervisor mode of operation).

If the memory address being accessed falls within the allowed range, the processing may continue at block 950; otherwise, at block 960, the processor may store the memory address being accessed in the stack status register.

At block 970, the processor may generate a stack fault exception.

The following examples illustrate various implementations in accordance with one or more aspect of the present disclosure.

Example 1 is a processing system, comprising: a lower stack bound register configured to store a first memory address, the first memory address identifying a lower bound of a memory addressable via a stack segment; an upper stack bound register configured to store a second memory address, the second memory address identifying an upper bound of the memory addressable via the stack segment; and a stack bounds checking logic configured to detect unauthorized stack pivoting, by comparing a memory address being accessed via the stack segment with at least one of the first memory address and the second memory address.

In Example 2, the stack bounds checking logic of the processing system of Example 1 may comprise a first adder configured to compare the memory address being accessed via the stack segment with the first memory address and a second adder configured to compare the memory address being accessed via the stack segment with the second memory address.

In Example 3, the stack bounds checking logic of the processing system of Example 1 may be further configured to generate a stack fault exception responsive to at least one of: determining that the memory address being accessed via the stack segment is less than the first memory address or determining that the memory address being accessed via the stack segment is greater than the second memory address.

In Example 4, the processing system of Example 1 may further comprise a stack status register, and the stack bounds checking logic may be further configured to store in the stack status register the memory address being accessed via the stack segment.

In Example 5, the processing system of Example 1 may be configured to operate in at least one of: a 32-bit user mode, a 64-bit user mode, or a supervisor mode; and the processing system may further comprise at least one of: a first lower stack bound register and a first upper stack bound register for the 32-bit user mode, a second lower stack bound register and a second upper stack bound register for the 64-bit user mode, and a third lower stack bound register or a third upper stack bound register for the supervisor mode.

In Example 6, the stack bounds checking logic of the processing system of Example 1 may be further configured, responsive to receiving a processor state save command, to store in a specified memory location values of the lower stack bound register and the upper stack bound register.

In Example 7, the stack bounds checking logic of the processing system of Example 1 may be further configured, responsive to receiving a processor state restore command, to load from a specified memory location values of the lower stack bound register and the upper stack bound register.

In Example 8, the stack bounds checking logic of the processing system of Example 1 may be further configured to ascertain whether an integrity check value is equal to a value of a pre-defined hash function of a value of the lower stack bound register, a value of the upper stack bound register, and a pre-defined key value.

In Example 9, the processing system of Example 1 may be configured to operate in at least one of: a user mode or a supervisor mode; and the stack bounds checking logic may be configured to disable changing values of the lower stack bound register and the upper stack bound register when operating the user mode.

In Example 10, the processing system of Example 1 may further comprise a base pointer (BP) register and a stack pointer (SP) register; and the stack bounds checking logic may be configured to store, using one of: the SP register or the BP register, the memory address being accessed via the stack segment.

In Example 11, the stack bound checking logic of the processing system of Example 10 may be further configured to enable detecting unauthorized stack pivoting if the memory address being accessed is stored using the SP register; and may be further configured to disable detecting unauthorized stack pivoting if the memory address being accessed is stored using the BP register.

In Example 12, the stack bound checking logic of the processing system of Example 1 may be further configured, responsive to receiving a stack check enable instruction, to enable detecting unauthorized stack pivoting; and may be further configured, responsive to receiving a stack check disable instruction, to disable detecting unauthorized stack pivoting.

Example 13 is a method of detecting unauthorized stack pivoting, comprising: storing, by a processing system, a first memory address in a lower stack bound register, the first memory address identifying a lower bound of a memory addressable via a stack segment; storing a second memory address in an upper stack bound register, the second memory address identifying an upper bound of the memory addressable via the stack segment; detecting a memory access via the stack segment; and comparing a memory address being accessed via the stack segment with at least one of the first memory address and the second memory address, in order to detect unauthorized stack pivoting.

In Example 14, the method of Example 13 may further comprise: storing in a stack status register the memory address being accessed via the stack segment.

In Example 15, the method of Example 13 may further comprise: determining that the memory address being accessed via the stack segment is less than the first memory address; and generating a stack fault exception.

In Example 16, the method of Example 13 may further comprise: determining that the memory address being accessed via the stack segment is greater than the second memory address; and generating a stack fault exception.

In Example 17, the method of Example 13 may further comprise: receiving a processor state save command; and storing in a memory a value of the lower stack bound register and a value of the upper stack bound register.

In Example 18, the method of Example 13 may further comprise: receiving a processor state restore command; and loading from a memory a value of the lower stack bound register and a value of the upper stack bound register.

In Example 19, the method of Example 13 may further comprise: receiving a processor state restore command; determining that an integrity check value is equal to a value of a pre-defined hash function of a value of the lower stack bound register, a value of the upper stack bound register, and a pre-defined key value; and loading the stack bound values into the lower stack bound register and the upper stack bound register.

Example 20 is an apparatus comprising a memory and a processing system coupled to the memory, wherein the processing system is configured to perform the method of any of the Examples 13-19.

Example 21 is a computer-readable non-transitory storage medium comprising executable instructions that, when executed by a processing system, cause the processing system to perform operations, comprising: storing a first memory address in a lower stack bound register, the first memory address identifying a lower bound of a memory addressable via a stack segment; storing a second memory address in an upper stack bound register, the second memory address identifying an upper bound of the memory addressable via the stack segment; detecting a memory access via the stack segment; and comparing a memory address being accessed via the stack segment with at least one of the first address and the second address, to detect an attempted stack bounds violation.

In Example 22, the computer-readable non-transitory storage medium of Example 21 may further comprise executable instructions causing the computing system to store in a stack status register the memory address being accessed via the stack segment.

In Example 23, the computer-readable non-transitory storage medium of Example 21 may further comprise executable instructions causing the computing system to determine that the memory address being accessed via the stack segment is less than the first memory address, and generate a stack fault exception.

In Example 24, the computer-readable non-transitory storage medium of Example 21 may further comprise executable instructions causing the computing system to determine that the memory address being accessed via the stack segment is greater than the second memory address, and generate a stack fault exception.

In Example 25, the computer-readable non-transitory storage medium of Example 21 may further comprise executable instructions causing the computing system to receive a processor state save command, and store in a memory a value of the lower stack bound register and a value of the upper stack bound register.

In Example 26, the computer-readable non-transitory storage medium of Example 21 may further comprise executable instructions causing the computing system to receive a processor state restore command, and load from a memory a value of the lower stack bound register and a value of the upper stack bound register.

In Example 27, the computer-readable non-transitory storage medium of Example 21 may further comprise executable instructions causing the computing system to receive a processor state restore command; determine that an integrity check value is equal to a value of a pre-defined hash function of a value of the lower stack bound register, a value of the upper stack bound register, and a pre-defined key value; and load the stack bound values into the lower stack bound register and the upper stack bound register.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second,"

"third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
a lower stack bound register for at least one of: a 32-bit user mode, a 64-bit user mode, or a supervisor mode, for storing a first memory address, the first memory address identifying a lower bound of a memory addressable via a stack segment;
an upper stack bound register for at least one of: the 32-bit user mode, the 64-bit user mode, or the supervisor mode, for storing a second memory address, the second memory address identifying an upper bound of the memory addressable via the stack segment; and
a stack bounds checking logic to detect unauthorized stack pivoting, by comparing a memory address being accessed via the stack segment with at least one of the first memory address and the second memory address;
wherein the processing system is to operate in at least one of: the 32-bit user mode, the 64-bit user mode, or the supervisor mode.

2. The processing system of claim 1, wherein the stack bounds checking logic comprises:
a first adder to compare the memory address being accessed via the stack segment with the first memory address; and
a second adder to compare the memory address being accessed via the stack segment with the second memory address.

3. The processing system of claim 1, wherein the stack bounds checking logic is further to generate a stack fault exception responsive to at least one of: determining that the memory address being accessed via the stack segment is less than the first memory address or determining that the memory address being accessed via the stack segment is greater than the second memory address.

4. The processing system of claim 1, further comprising a stack status register; wherein the stack bounds checking logic is further to store in the stack status register the memory address being accessed via the stack segment.

5. The processing system of claim 1, wherein the stack bounds checking logic is further to, responsive to receiving a processor state save command, store in a specified memory location values of the lower stack bound register and the upper stack bound register.

6. The processing system of claim 1, wherein the stack bounds checking logic is further to, responsive to receiving a processor state restore command, load from a specified memory location values of the lower stack bound register and the upper stack bound register.

7. The processing system of claim 6, wherein the stack bounds checking logic is further to ascertain whether an integrity check value is equal to a value of a pre-defined hash function of a value of the lower stack bound register, a value of the upper stack bound register, and a pre-defined key value.

8. The processing system of claim 1, wherein the stack bounds checking logic is to disable changing values of the lower stack bound register and the upper stack bound register when operating in one of: the 32-bit user mode or the 64-bit user mode.

9. The processing system of claim 1, further comprising:
a base pointer (BP) register; and
a stack pointer (SP) register;
wherein the stack bound checking logic is further to store, using one of: the SP register or the BP register, the memory address being accessed via the stack segment.

10. The processing system of claim 9, wherein the stack bounds checking logic is further to enable detecting unauthorized stack pivoting if the memory address being accessed is stored using the SP register; and wherein the stack bounds checking logic is further to disable detecting unauthorized stack pivoting if the memory address being accessed is stored using the BP register.

11. The processing system of claim 1, wherein the stack bounds checking logic is further to:
responsive to receiving a stack check enable instruction, enable detecting unauthorized stack pivoting; and
responsive to receiving a stack check disable instruction, disable detecting unauthorized stack pivoting.

12. A method, comprising:
storing, by a processing system, a first memory address in a lower stack bound register, the lower stack bound register associated with at least one of: a 32-bit user mode, a 64-bit user mode, or a supervisor mode, the first memory address identifying a lower bound of a memory addressable via a stack segment;
storing a second memory address in an upper stack bound register, the upper stack bound register associated with at least one of: a 32-bit user mode, a 64-bit user mode, or a supervisor mode, the second memory address identifying an upper bound of the memory addressable via the stack segment;
detecting a memory access via the stack segment; and
detect unauthorized stack pivoting by comparing a memory address being accessed via the stack segment with at least one of the first memory address and the second memory address.

13. The method of claim 12, further comprising:
storing in a stack status register the memory address being accessed via the stack segment.

14. The method of claim 12, further comprising:
determining that the memory address being accessed via the stack segment is less than the first memory address; and
generating a stack fault exception.

15. The method of claim 12, further comprising:
determining that the memory address being accessed via the stack segment is greater than the second memory address; and
generating a stack fault exception.

16. The method of claim 12, further comprising:
receiving a processor state save command; and
storing in a memory a value of the lower stack bound register and a value of the upper stack bound register.

17. The method of claim 12, further comprising:
receiving a processor state restore command; and
loading from a memory a value of the lower stack bound register and a value of the upper stack bound register.

18. The method of claim 12, further comprising:
receiving a processor state restore command;
determining that an integrity check value is equal to a value of a pre-defined hash function of a value of the lower stack bound register, a value of the upper stack bound register, and a pre-defined key value; and
loading the stack bound values into the lower stack bound register and the upper stack bound register.

19. A computer-readable non-transitory storage medium comprising executable instructions that, when executed by a processing system, cause the processing system to perform operations, comprising:
storing a first memory address in a lower stack bound register, the lower stack bound register associated with at least one of: a 32-bit user mode, a 64-bit user mode, or a supervisor mode, the first memory address identifying a lower bound of a memory addressable via a stack segment;
storing a second memory address in an upper stack bound register, the upper stack bound register associated with at least one of: a 32-bit user mode, a 64-bit user mode, or a supervisor mode, the second memory address identifying an upper bound of the memory addressable via the stack segment;
detecting a memory access via the stack segment; and
detect an attempted stack bounds violation by comparing a memory address being accessed via the stack segment with at least one of the first address and the second address.

* * * * *